(12) United States Patent
Tsujino et al.

(10) Patent No.: US 12,552,254 B2
(45) Date of Patent: Feb. 17, 2026

(54) DISPLAY CONTROL DEVICE, DISPLAY SYSTEM, AND DISPLAY CONTROL METHOD

(71) Applicant: TOYOTA JIDOSHA KABUSHIKI KAISHA, Toyota (JP)

(72) Inventors: Miki Tsujino, Nagakute (JP); Masashi Hatanaka, Toyota (JP); Makoto Konishi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/536,540

(22) Filed: Dec. 12, 2023

(65) Prior Publication Data

US 2024/0270073 A1 Aug. 15, 2024

(30) Foreign Application Priority Data

Feb. 9, 2023 (JP) ................ 2023-018745

(51) Int. Cl.
*B60K 35/28* (2024.01)
*B60K 35/233* (2024.01)
*G06V 20/58* (2022.01)

(52) U.S. Cl.
CPC ............ *B60K 35/28* (2024.01); *B60K 35/233* (2024.01); *G06V 20/58* (2022.01);
(Continued)

(58) Field of Classification Search
CPC .............. B60K 35/28; B60K 35/233; B60K 2360/176; B60K 2360/1868;
(Continued)

(56) References Cited

U.S. PATENT DOCUMENTS 8,692,739 B2 * 4/2014 Mathieu ............... B60K 35/233
382/104
10,688,997 B2 * 6/2020 Habu ................ B60W 30/0956
(Continued)

FOREIGN PATENT DOCUMENTS

JP 2021-109582 A 8/2021
WO WO-2019089699 A1 * 5/2019 ............... G08G 1/22

Primary Examiner — Scott A Browne
Assistant Examiner — Shahira Baajour
(74) Attorney, Agent, or Firm — SoraIP, Inc.

(57) ABSTRACT

The display control device includes a peripheral information acquisition unit that acquires peripheral information around the own vehicle, and a preceding vehicle information acquisition unit that acquires preceding vehicle information of a preceding vehicle traveling in a lane ahead of the own vehicle based on the surrounding information; an adjacent vehicle information acquisition unit that acquires adjacent vehicle information of an adjacent vehicle traveling in an adjacent lane adjacent to the driving lane based on the surrounding information; an effect calculation unit for calculating effect information of the slipstream for the vehicle, and based on the effect information, the effect of the slipstream for the preceding vehicle and the adjacent vehicle is moved toward the rear of the vehicle from the preceding vehicle display unit and the adjacent vehicle display unit; and a display control unit that controls display by animation.

10 Claims, 5 Drawing Sheets

(52) U.S. Cl.
CPC ............... *B60K 2360/176* (2024.01); *B60K 2360/1868* (2024.01); *B60K 2360/785* (2024.01); *G06V 2201/08* (2022.01)

(58) Field of Classification Search
CPC .. B60K 2360/785; B60K 35/00; B60K 35/29; G06V 20/58; G06V 2201/08; G08G 1/0969; G08G 1/0108; G08G 1/0129; G08G 1/0137; G08G 1/017; G08G 1/048; G08G 1/0962; G08G 1/0965
See application file for complete search history.

(56) References Cited

U.S. PATENT DOCUMENTS

| | | | |
|---|---|---|---|
| 11,702,096 B1* | 7/2023 | Wells | H04W 4/46 340/435 |
| 2023/0349709 A1* | 11/2023 | Nagata | G08G 1/096844 |

* cited by examiner

DISPLAY CONTROL DEVICE, DISPLAY SYSTEM, AND DISPLAY CONTROL METHOD

CROSS-REFERENCE TO RELATED APPLICATION

This application claims priority to Japanese Patent Application No. 2023-018745 filed on Feb. 9, 2023, incorporated herein by reference in its entirety.

BACKGROUND

1. Technical Field

The present disclosure relates to a display control device and a display system.

2. Description of Related Art

Japanese Unexamined Patent Application Publication No. 2021-109582 (JP 2021-109582 A) discloses a technique of displaying a vehicle front end image, a vehicle to be tracked located in a region above the vehicle front end image, and a barometer representing the inter-vehicle distance between the vehicle to be tracked and a host vehicle, on an information display provided in front of a driver's seat.

SUMMARY

In a display control device, it is preferable to enable one to recognize which of a preceding vehicle and an adjacent vehicle provides a greater slipstream effect.

An object of the present disclosure is to provide a display control device that allows one to recognize which of a preceding vehicle and an adjacent vehicle provides a greater slipstream effect.

A first aspect provides a display control device including:
a peripheral information acquisition unit that acquires peripheral information around a host vehicle;
a preceding vehicle information acquisition unit that acquires preceding vehicle information on a preceding vehicle traveling ahead in a traveling lane of the host vehicle based on the peripheral information;
an adjacent vehicle information acquisition unit that acquires adjacent vehicle information on an adjacent vehicle traveling in an adjacent lane adjacent to the traveling lane based on the peripheral information;
an effect calculation unit that calculates effect information on an effect of a slipstream on the preceding vehicle and the adjacent vehicle based on the preceding vehicle information and the adjacent vehicle information; and
a display control unit that performs control so as to display, based on the effect information, the effect of the slipstream on the preceding vehicle and the adjacent vehicle using an animation that moves rearward of a vehicle from a preceding vehicle display unit that displays the preceding vehicle and an adjacent vehicle display unit that displays the adjacent vehicle.

The display control device according to the first aspect includes a display control unit that performs control so as to display, based on the effect information on the effect of the slipstream on the preceding vehicle and the adjacent vehicle, the effect of the slipstream on the preceding vehicle and the adjacent vehicle using an animation that moves rearward of a vehicle from a preceding vehicle display unit and an adjacent vehicle display unit. Thus, the effect of the slipstream on the preceding vehicle and the adjacent vehicle is displayed using an animation. This allows one to recognize which of the preceding vehicle and the adjacent vehicle provides a greater slipstream effect. As a result, it is possible to provide a display control device that allows a driver to drive while keeping eco-driving in mind.

In a display control device according to a second aspect that depends on the display control device according to the first aspect, the display control unit may display the animation at a higher moving speed as the effect of the slipstream is greater.

In the display control device according to the second aspect, the display control unit displays the animation at a higher moving speed as the effect of the slipstream is greater. Consequently, the animation is displayed at a high moving speed when the effect of the slipstream is great. Meanwhile, the animation is displayed at a low moving speed when the effect of the slipstream is small. Therefore, it is possible to allow one to easily recognize which of the preceding vehicle and the adjacent vehicle provides a greater slipstream effect.

In a display control device according to a third aspect that depends on the display control device according to the second aspect, the display control unit may display the animation in a larger size as the effect of the slipstream is greater.

In the display control device according to the third aspect, the display control unit displays the animation in a larger size as the effect of the slipstream is greater. Consequently, the animation is displayed in a large size when the effect of the slipstream is great. Meanwhile, the animation is displayed in a small size when the effect of the slipstream is small. Therefore, it is possible to allow one to easily recognize which of the preceding vehicle and the adjacent vehicle provides a greater slipstream effect.

A fourth aspect provides a display system including: the display control device according to any one of the first to third aspects; and a display unit provided in front of a driver's seat in a vehicle cabin to display an image controlled by the display control device.

The display system according to the fourth aspect includes a display unit provided in front of a driver's seat in a vehicle cabin to display an image controlled by the display control device. Consequently, the effect of the slipstream on the preceding vehicle is displayed in front of the driver's seat. Therefore, a driver can easily recognize that the slipstream effect is occurring.

A fifth aspect provides a display control method including:
acquiring peripheral information around a host vehicle;
acquiring preceding vehicle information on a preceding vehicle traveling ahead in a traveling lane of the host vehicle based on the peripheral information;
acquiring adjacent vehicle information on an adjacent vehicle traveling in an adjacent lane adjacent to the traveling lane based on the peripheral information;
calculating effect information on an effect of a slipstream on the preceding vehicle and the adjacent vehicle based on the preceding vehicle information and the adjacent vehicle information; and
performing control so as to display, based on the effect information, the effect of the slipstream on the preceding vehicle and the adjacent vehicle using an animation that moves rearward of a vehicle from a preceding vehicle display unit that displays the preceding vehicle and an adjacent vehicle display unit that displays the adjacent vehicle.

The display control method according to the fifth aspect allows one to recognize which of the preceding vehicle and the adjacent vehicle provides a greater slipstream effect.

As described above, the display control device according to the present disclosure allows one to recognize which vehicle of the preceding vehicle and the adjacent vehicle provides a greater slipstream effect.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A display system 1 including a display control device 30 according to an embodiment will be described below with reference to the drawings. Behind a moving vehicle, a phenomenon called a slipstream occurs where air resistance is lower than usual. By entering the own vehicle into this slipstream, it becomes possible to reduce air resistance and suppress energy loss for running.

The display system 1 according to the present embodiment will be described as an example of displaying the effect of a slip stream by a preceding vehicle and an adjacent vehicle traveling in front of the own vehicle. An arrow UP shown in FIG. 1 indicates the upper side in the vertical direction of the vehicle. An arrow RH indicates the right side in the vehicle width direction. An arrow FR indicates the front side in the vehicle longitudinal direction.

Configuration of Own Vehicle 10

Figure 1:
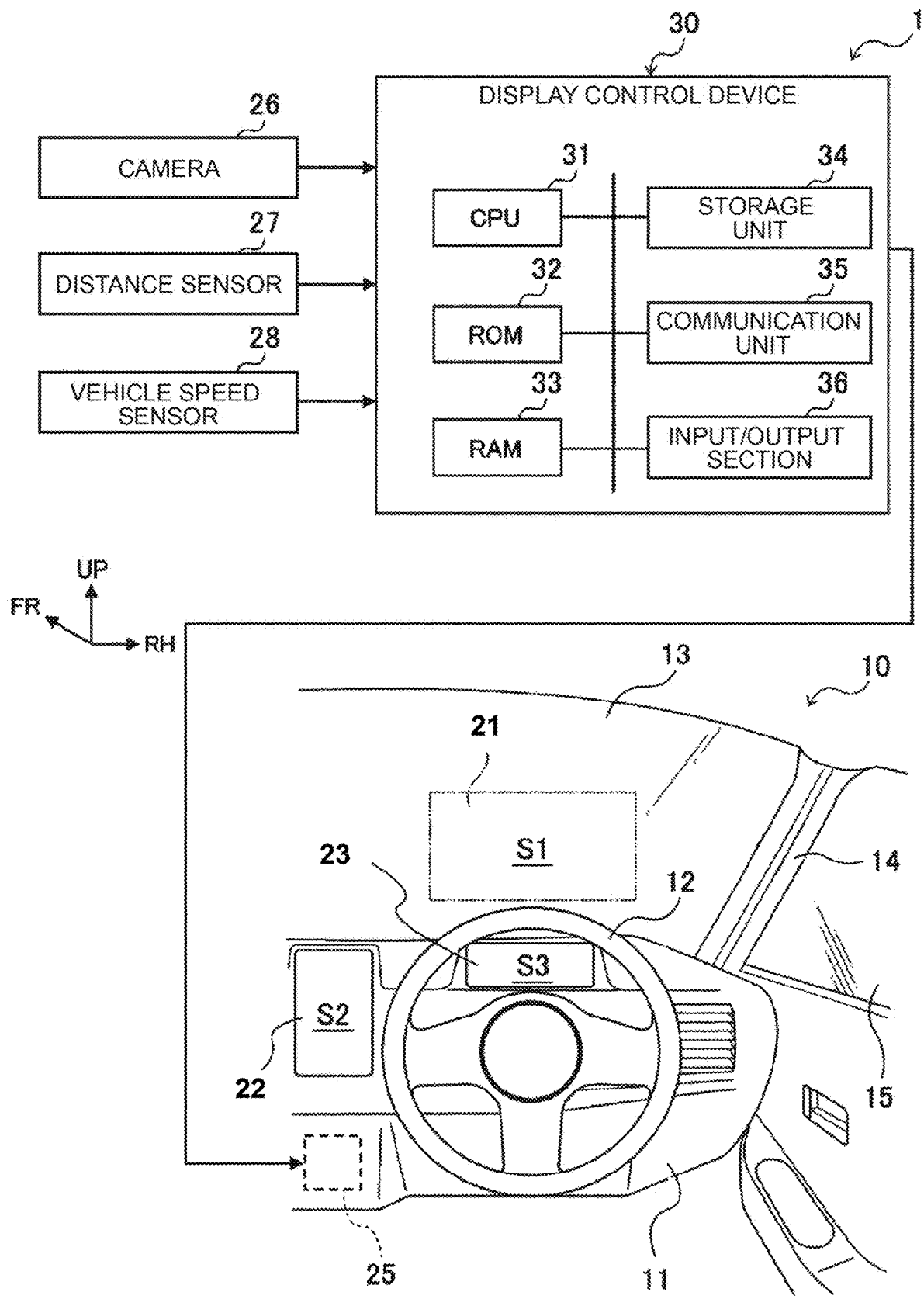
FIG. 1 is a schematic diagram schematically showing the entire system according to an embodiment.

As shown in FIG. 1, an instrument panel 11 is provided in the front part of the vehicle cabin of the vehicle 10. The instrument panel 11 extends in the width direction of the vehicle. A steering wheel 12 is provided on the vehicle right side of the instrument panel 11.

A windshield glass 13 is provided at the front end of the instrument panel 11. The windshield glass 13 extends in the vertical direction and the width direction of the vehicle to separate the interior of the vehicle cabin from the exterior of the vehicle cabin.

A vehicle right end portion of the windshield glass 13 is fixed to a vehicle right front pillar 14. The front pillar 14 extends in the vertical direction of the vehicle. A windshield glass 13 is fixed to the vehicle width direction inner end portion of the front pillar 14. A front end portion of a front side glass 15 is fixed to the outer end portion of the front pillar 14 in the vehicle width direction.

The windshield glass 13 is provided with a first display unit 21 as a display unit having a display area S1 for displaying an image. The first display unit 21 is provided on the vehicle upper side of the steering wheel 12. The first display unit 21 constitutes a projection surface projected by a head-up display device 25 as a display device. Specifically, a head-up display device 25 capable of projecting an image is provided on the vehicle front side of the instrument panel 11. The configuration is made such that an image is projected from the head-up display device 25 onto the first display unit 21 of the windshield glass 13.

The instrument panel 11 includes a second display unit 22 as a display unit having a display area S2 for displaying an image, and a third display unit 23 as a display unit having a display area S3 for displaying an image. The second display unit 22 is configured by a center display arranged at the central portion of the instrument panel 11 in the vehicle width direction. The third display unit 23 is configured by a meter display provided in front of the driver's seat.

Configuration of Display System 1

As shown in FIG. 1, the display system 1 includes a camera 26, an inter-vehicle distance sensor 27, a vehicle speed sensor 28, a display control device 30, a head-up display device 25, and a first display unit 21.

The camera 26 is provided on the own vehicle 10 and attached so as to photograph the front of the own vehicle 10.

The inter-vehicle distance sensor 27 is provided in the own vehicle 10. The inter-vehicle distance sensor 27 measures the inter-vehicle distance between the preceding vehicle traveling in front of the own vehicle 10 and the own vehicle 10, and the distance between the adjacent vehicle traveling in the adjacent lane adjacent to the traveling lane of the own vehicle 10 and the own vehicle 10. A laser radar device, a millimeter-wave radar device, or the like can be used as the inter-vehicle distance sensor 27. The vehicle speed sensor 28 is provided in the own vehicle 10 and detects the vehicle speed of the own vehicle 10.

The display control device 30 is provided in the own vehicle 10 and performs various controls. The display control device 30 can be an Electronic Control Unit (ECU).

Hardware Configuration of the Display Control Device 30

As shown in FIG. 1, the display control device 30 includes a Central Processing Unit (CPU) 31, a Read Only Memory (ROM) 32, a Random Access Memory (RAM) 33, a storage unit 34, a communication unit 35, and an input/output unit 36. Each component is communicably connected to each other via an internal bus 37.

The CPU 31 is a central processing unit that executes various programs and controls each section. That is, the CPU 31 reads a program from the ROM 32 or the storage unit 34 and executes the program using the RAM 33 as a work area. In addition, the CPU 31 performs control of each configuration and various arithmetic processing according to programs recorded in the ROM 32 or the storage unit 34.

The ROM 32 stores various programs and various data. RAM 33 temporarily stores programs or data as a work area. The storage unit 34 is configured by a Hard Disk Drive (HDD) or Solid State Drive (SSD), and is a non-temporary recording medium for storing various programs including an operating system and various data. In this embodiment, the ROM 32 or storage unit 34 stores a program for performing display control processing and the like, which will be described later.

The communication unit 35 is an interface for the display control device 30 to communicate with a server and other devices, such as Controller Area Network (CAN), Ethernet (registered trademark), Long Term Evolution (LTE), Fiber Distributed Data Interface (FDDI), Wi-Fi (registered trademark) and other standards are used.

The input/output unit 36 is connected to the first display unit 21, the second display unit 22, the head-up display device 25, the camera 26, the inter-vehicle distance sensor 27, the vehicle speed sensor 28, and the like.

Functional Configuration of the Display Control Device 30

Figure 2:
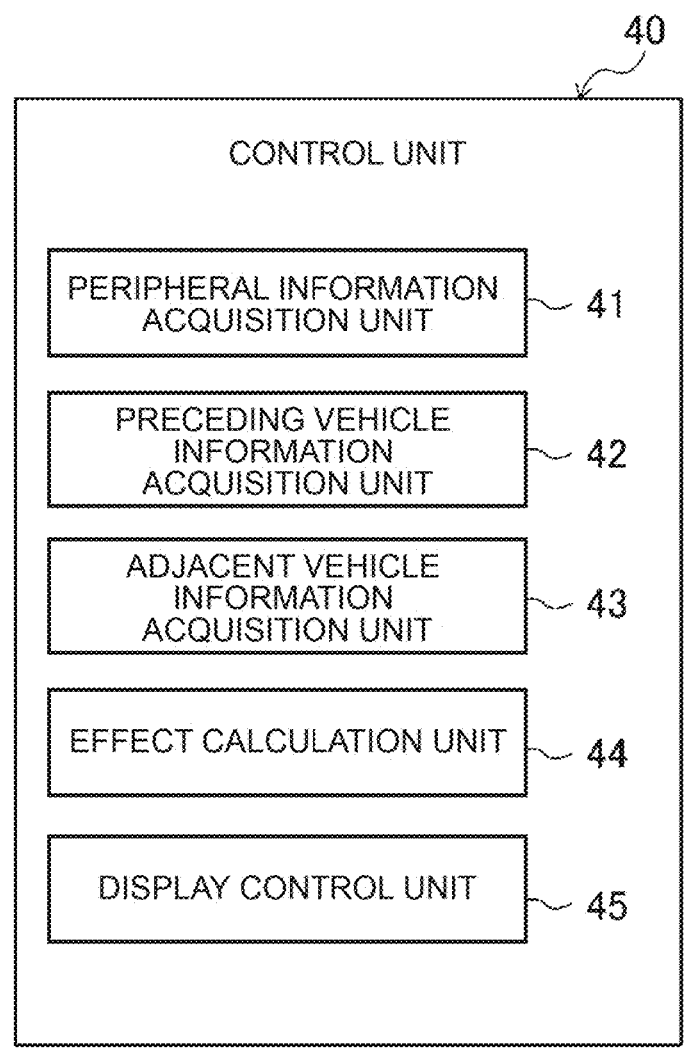
FIG. 2 is a block diagram showing the functional configuration of the display control device according to the embodiment.

In the display control device 30, the camera image captured by the camera 26, the detection information detected by the inter-vehicle distance sensor 27, and the detection information detected by the vehicle speed sensor 28 are input to the control unit 40 (see FIG. 2). Processing information that has undergone display control processing in the control unit 40 is output to the head-up display device 25. In the control unit 40, the CPU 31 executes display control processing according to programs recorded in the ROM 32 or the storage unit 34.

As shown in FIG. 2, the control unit 40 functionally includes a peripheral information acquisition unit 41, a preceding vehicle information acquisition unit 42, an adjacent vehicle information acquisition unit 43, an effect calculation unit 44, and a display control unit 45.

The peripheral information acquisition unit 41 acquires peripheral information around the vehicle 10 based on the camera image captured by the camera 26.

Based on the camera image acquired by the peripheral information acquisition unit 41, the vehicle speed of the vehicle 10 detected by the vehicle speed sensor 28, and the distance to the preceding vehicle detected by the inter-vehicle distance sensor 27, the preceding vehicle information acquisition unit 42 Then, the preceding vehicle information of the preceding vehicle traveling in front of the vehicle 10 is obtained.

Specifically, the preceding vehicle information acquisition unit 42 identifies the vehicle type of the preceding vehicle based on the camera image acquired by the peripheral information acquisition unit 41, and acquires information on the size of the preceding vehicle. For example, the preceding vehicle information acquisition unit 42 identifies the vehicle type of the preceding vehicle by image recognition, and acquires information on the size of the preceding vehicle. In addition, the preceding vehicle information acquisition unit 42 obtains information on the vehicle speed of the preceding vehicle based on the vehicle speed of the own vehicle 10 detected by the vehicle speed sensor 28 and the change in the distance between the preceding vehicle and the preceding vehicle detected by the inter-vehicle distance sensor 27.

The adjacent vehicle information acquisition unit 43 acquires information based on the camera image acquired by the peripheral information acquisition unit 41, the vehicle speed of the host vehicle 10 detected by the vehicle speed sensor 28, and the inter-vehicle distance to the adjacent vehicle detected by the inter-vehicle distance sensor 27. Then, the adjacent vehicle information of the adjacent vehicle traveling in front of the adjacent lane adjacent to the lane in which the host vehicle 10 is traveling is acquired.

Specifically, the adjacent vehicle information acquisition unit 43 identifies the vehicle type of the adjacent vehicle based on the camera image acquired by the peripheral information acquisition unit 41, and acquires information on the size of the adjacent vehicle. For example, the adjacent vehicle information acquisition unit 43 identifies the vehicle type of the adjacent vehicle by image recognition, and acquires information on the size of the adjacent vehicle. In addition, the adjacent vehicle information acquisition unit 43 obtains information about the vehicle speed of the adjacent vehicle based on the vehicle speed of the host vehicle 10 detected by the vehicle speed sensor 28 and the change in the distance between the adjacent vehicles detected by the inter-vehicle distance sensor 27.

The effect calculation unit 44 calculates slipstream effect information for the preceding vehicle based on the preceding vehicle information. Further, the effect calculation unit 44 calculates slipstream effect information for the adjacent vehicle based on the adjacent vehicle information.

The effect calculation unit 44 also determines the magnitude of the effect of the slipstream on the preceding vehicle and the adjacent vehicle. The effect calculation unit 44 determines that the effect of the slipstream is greater as the size of the preceding vehicle acquired by the preceding vehicle information acquisition unit 42 is larger. The effect calculation unit 44 determines that the effect of the slipstream is greater as the vehicle speed of the preceding vehicle acquired by the preceding vehicle information acquisition unit 42 is faster. The effect calculation unit 44 determines that the effect of the slipstream is greater as the size of the adjacent vehicle acquired by the adjacent vehicle information acquisition unit 43 is larger. The effect calculation unit 44 determines that the effect of the slipstream is greater as the vehicle speed of the adjacent vehicle acquired by the adjacent vehicle information acquisition unit 43 is faster.

The display control unit 45 performs control to display the effect of the slipstream on the preceding vehicle based on the effect information calculated by the effect calculation unit 44. Specifically, the display control unit 45 performs control to display the effect of the slipstream on the preceding vehicle behind the preceding vehicle display unit 110A (see FIG. 3) that displays the preceding vehicle in the driving lane. Based on the effect information calculated by the effect calculation unit 44, the display control unit 45 performs control to display the effect of the slipstream on the adjacent vehicle. Specifically, in the adjacent lane, the display control unit 45 performs control to display the effect of the slipstream on the adjacent vehicle behind the adjacent vehicle display unit 210A (see FIG. 3) that displays the adjacent vehicle.

Figure 3:
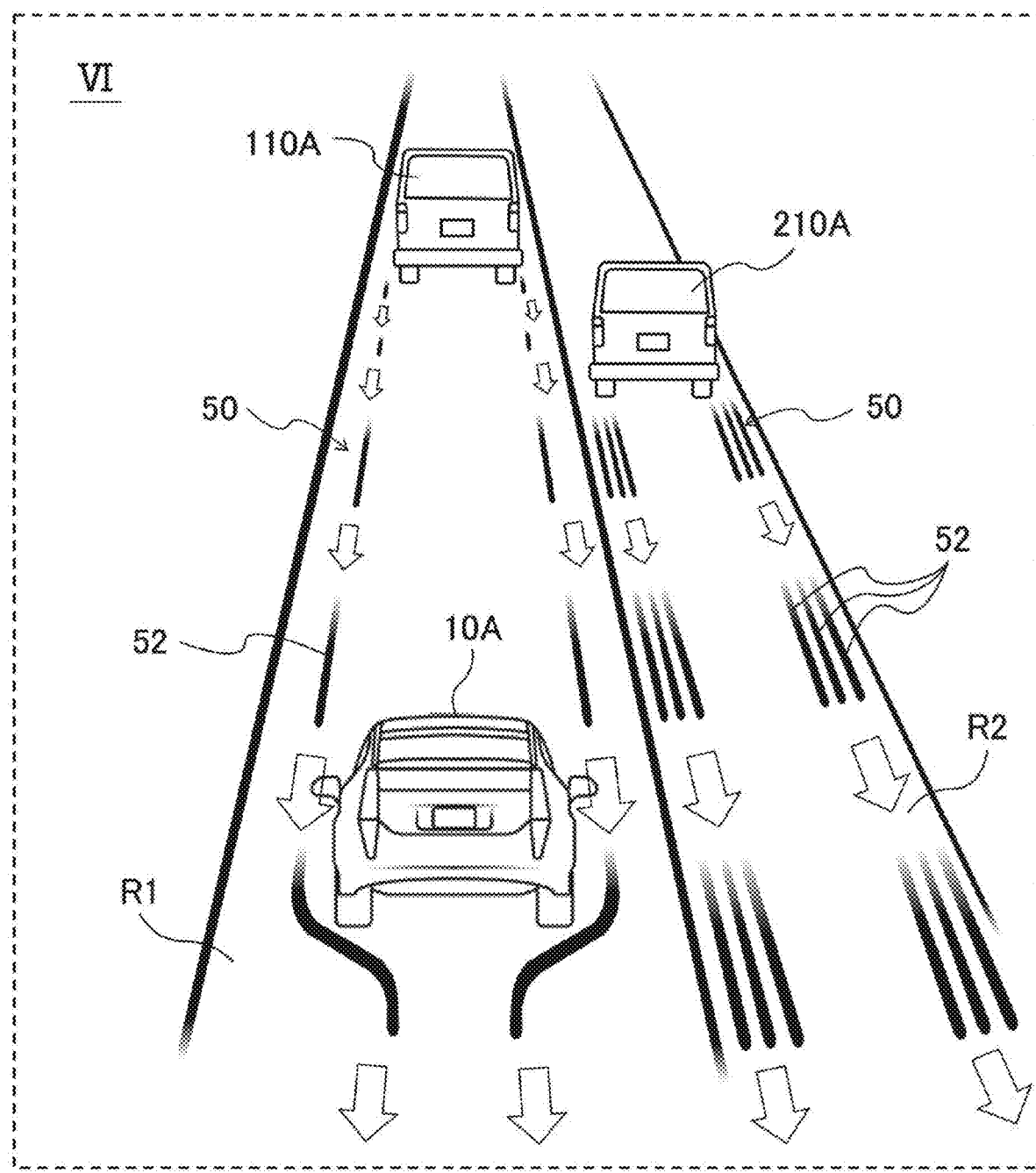
FIG. 3 is a diagram showing a display example by the display control device according to the embodiment.

Specifically, as shown in FIG. 3, the display control unit 45 controls the effect of the slipstream on the preceding vehicle to be displayed on the host vehicle display unit 10A that displays the own vehicle 10 and the preceding vehicle display unit 110A in the driving lane R1. Control is performed to display as animation 50 on both sides in the vehicle width direction.

The display control unit 45 performs control to display the effect of the slipstream on the preceding vehicle by an animation 50 in which the mark 52 moves from the preceding vehicle display unit 110A toward the host vehicle display unit 10A. The mark 52 may have a linear shape extending in the longitudinal direction of the vehicle.

The display control unit 45 performs control to display the effect of the slipstream on the adjacent vehicle as an animation 50 on both sides of the adjacent vehicle display unit 210A in the vehicle width direction in the adjacent lane R2.

The display control unit 45 performs control to display the effect of the slipstream on the adjacent vehicle by an animation 50 in which the mark 52 moves from the adjacent vehicle display unit 210A toward the vehicle rear of the adjacent vehicle display unit 210A. The mark 52 may have a linear shape extending in the longitudinal direction of the vehicle.

As shown in FIG. 3, when the effect calculation unit 44 calculates that the effect of the slipstream of the preceding vehicle is small and the effect of the slipstream of the adjacent vehicle is large, the display control unit 45 changes the mark 52 of the driving lane R1. Control is performed to slow down the moving speed and speed up the moving speed of the mark 52 on the adjacent lane R2. In other words, the display control unit 45 performs control to increase the moving speed of the animation 50 of the lane for which the effect calculation unit 44 has calculated that the effect of the slipstream is large.

Further, when the effect calculation unit 44 calculates that the effect of the slipstream of the preceding vehicle is small and the effect of the slipstream of the adjacent vehicle is large, the display control unit 45 calculates the number of marks 52 in the width direction of the driving lane R1. Control is performed to decrease the number and increase the number of marks 52 in the width direction of the adjacent lane R2. In the example of FIG. 3, the number of marks 52 in the vehicle width direction of the driving lane R1 is one, and the number of the marks 52 of the adjacent lane R2 in the vehicle width direction is three. In other words, the display control unit 45 controls to display the animation 50 of the lane in which the effect calculation unit 44 has calculated that the effect of the slipstream is large.

Figure 4:
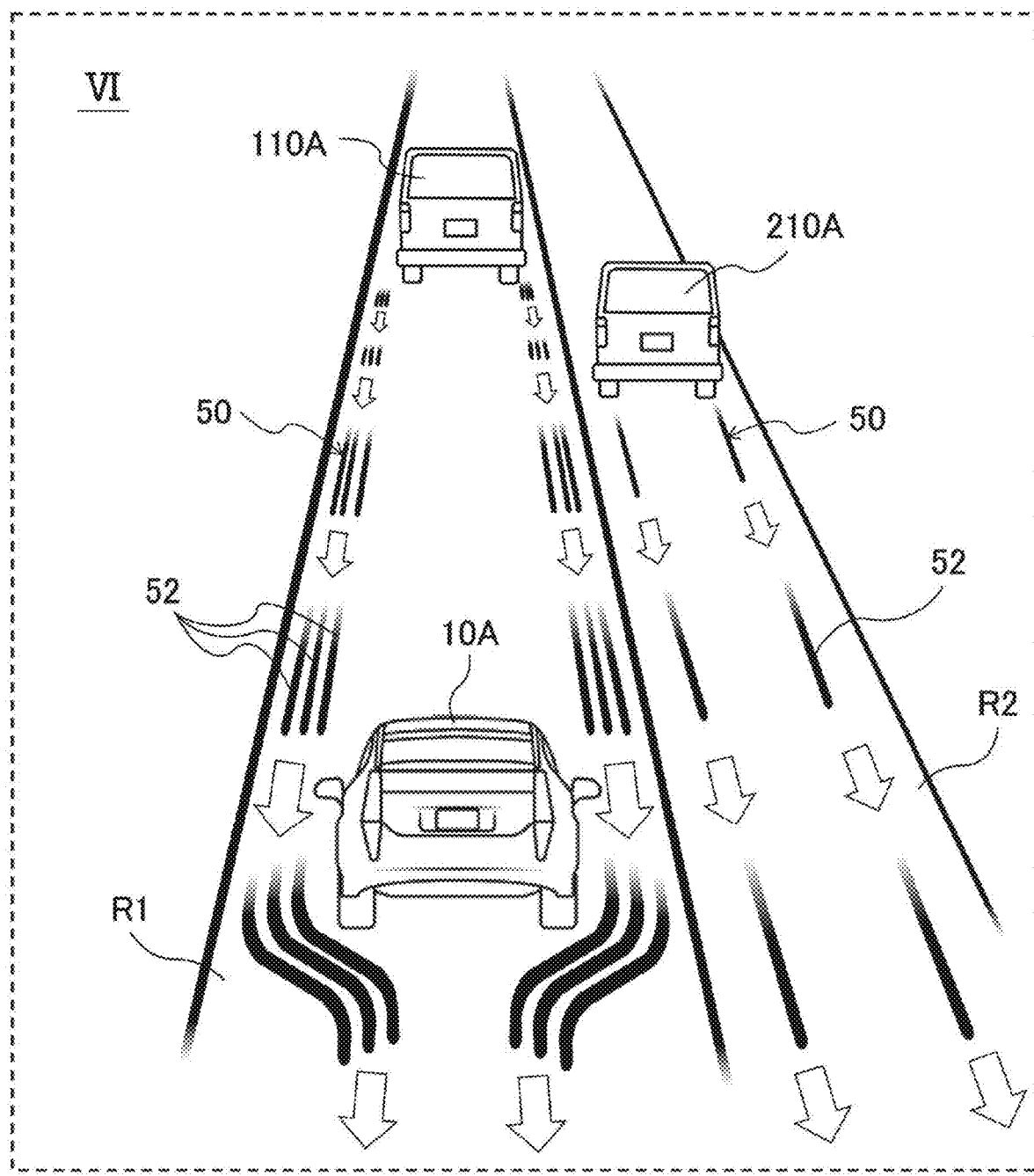
FIG. 4 is a diagram showing a display example by the display control device according to the embodiment.

As shown in FIG. 4, when the effect calculation unit 44 calculates that the effect of the slipstream of the preceding vehicle is large and the effect of the slipstream of the adjacent vehicle is small, the display control unit 45 moves the mark 52 of the driving lane R1. Control is performed to increase the speed and decrease the moving speed of the mark 52 on the adjacent lane R2.

Further, when the effect calculation unit 44 calculates that the effect of the slipstream of the preceding vehicle is large and the effect of the slipstream of the adjacent vehicle is small, the display control unit 45 increases the number of marks 52 in the width direction of the driving lane R1 and reduces the number of marks 52 of the adjacent lane R2 in the width direction. In the example of FIG. 4, the number of marks 52 in the vehicle width direction of the driving lane R1 is three, and the number of marks 52 of the adjacent lane R2 in the vehicle width direction is one.

Flow of Display Control Processing

Figure 5:
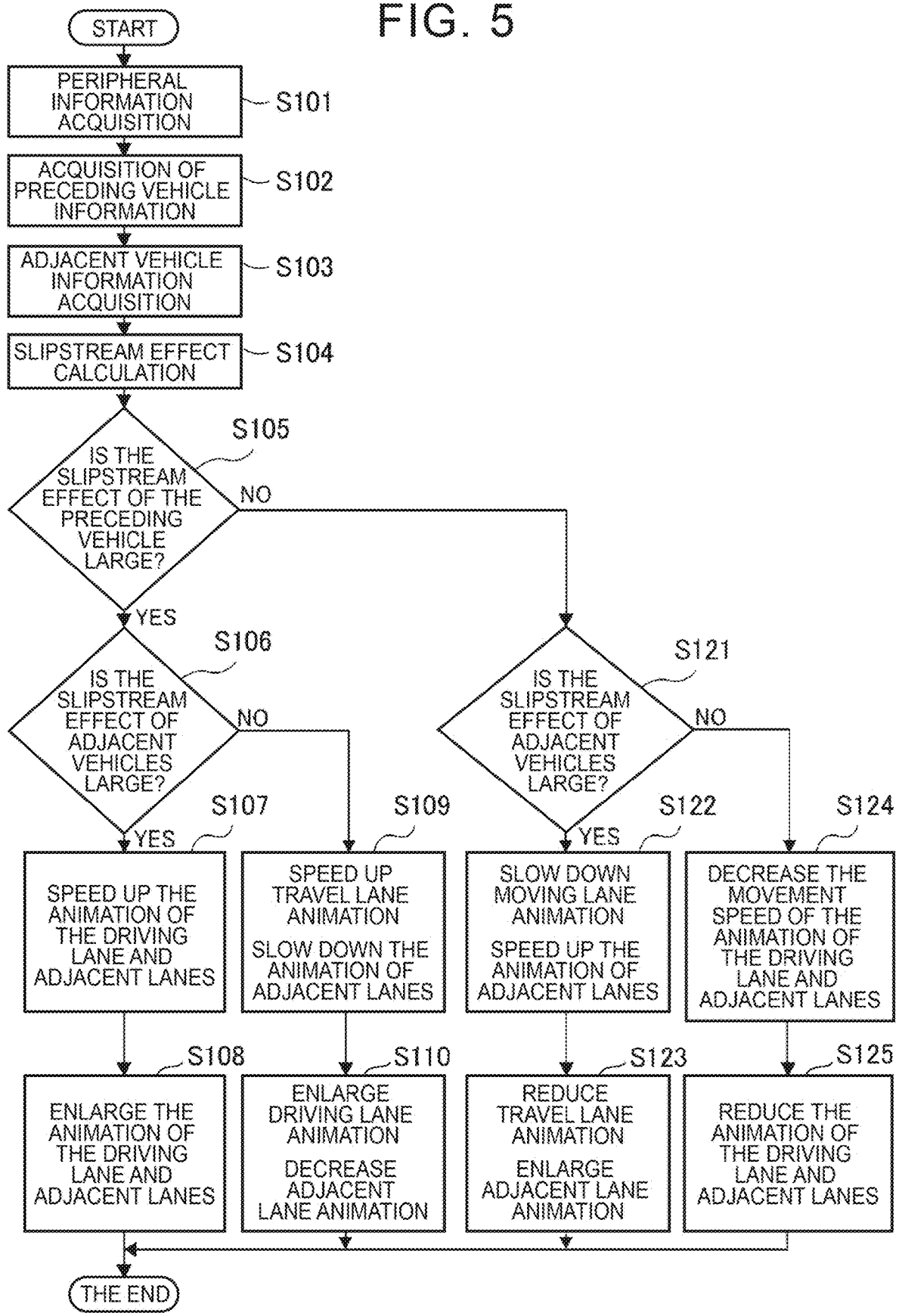
FIG. 5 is a flowchart showing the flow of processing by the display control device according to the embodiment.

As shown in FIG. 5, when the display control process is started, the peripheral information acquisition unit 41 acquires peripheral information around the host vehicle 10 based on the camera image captured by the camera 26 (S101).

Next, the preceding vehicle information acquisition unit 42 acquires the camera image acquired by the peripheral information acquisition unit 41, the vehicle speed of the own vehicle 10 detected by the vehicle speed sensor 28, the following distance to the preceding vehicle detected by the inter-vehicle distance sensor 27, the preceding vehicle information of the preceding vehicle traveling in front of the vehicle 10 on the driving lane R1 is acquired (S102).

Next, the adjacent vehicle information acquisition unit 43 acquires the camera image acquired by the peripheral information acquisition unit 41, the vehicle speed of the own vehicle 10 detected by the vehicle speed sensor 28, the distance between the adjacent vehicles detected by the inter-vehicle distance sensor 27, Adjacent vehicle information of an adjacent vehicle traveling in front of the adjacent lane R2 of the own vehicle 10 is acquired based on (S103).

Next, the effect calculation unit 44 calculates slipstream effect information for the preceding vehicle and slipstream effect information for the adjacent vehicle based on the preceding vehicle information and the adjacent vehicle information (S104).

Next, the effect calculation unit 44 determines whether the effect of the slipstream on the preceding vehicle is large (S105). If it is determined that the effect of the slipstream on the preceding vehicle is large (YES in S105), the process proceeds to S106. On the other hand, if it is determined that the effect of the slipstream on the preceding vehicle is small (NO in S105), the process proceeds to S121.

When the process proceeds to S106, the effect calculation unit 44 determines whether the effect of the slipstream on the adjacent vehicle is large. If it is determined that the effect of the slipstream on the adjacent vehicle is large (YES in S106), the process proceeds to S107. On the other hand, if it is determined that the effect of the slipstream on the adjacent vehicle is small (NO in S106), the process proceeds to S109.

When the process proceeds to S107, the display control unit 45 performs control to increase the moving speed of the animation 50 of the driving lane R1 and the adjacent lane R2.

Next, the display control unit 45 performs control to enlarge the animation 50 of the driving lane R1 and the adjacent lane R2 (S108), and ends the display control process.

When the process proceeds to S109, the display control unit 45 performs control to increase the moving speed of the animation 50 of the driving lane R1 and decrease the moving speed of the animation 50 of the adjacent lane R2.

Next, the display control unit 45 performs control to increase the animation 50 of the driving lane R1 and decrease the animation 50 of the adjacent lane R2 (S110), and ends the display control process.

When the process proceeds to S121, the effect calculation unit 44 determines whether the effect of the slipstream on the adjacent vehicle is large. If it is determined that the effect of the slipstream on the adjacent vehicle is large (YES in S121), the process proceeds to S122. On the other hand, if it is determined that the effect of the slipstream on the adjacent vehicle is small (NO in S121), the process proceeds to S124.

When the process proceeds to S122, the display control unit 45 performs control to slow down the moving speed of the animation 50 of the driving lane R1 and speed up the moving speed of the animation 50 of the adjacent lane R2.

Next, the display control unit 45 performs control to decrease the animation 50 of the driving lane R1 and increase the animation 50 of the adjacent lane R2 (S123), and ends the display control process.

When the process proceeds to S124, the display control unit 45 performs control to slow down the moving speed of the animation 50 of the driving lane R1 and the adjacent lane R2.

Next, the display control unit 45 performs control to reduce the animation 50 of the driving lane R1 and the adjacent lane R2 (S125), and ends the display control process.

When the effect calculation unit 44 calculates that the effect of the slipstream is negligible, the display control unit 45 may perform control so as not to display the effect of the slipstream.

Action

The display control device 30 according to the present embodiment includes a peripheral information acquisition unit 41 that acquires peripheral information around the host vehicle 10, and a preceding vehicle that travels ahead of the host vehicle 10 on the driving lane R1 based on the peripheral information. A preceding vehicle information acquisition unit 42 that acquires preceding vehicle information; an adjacent vehicle information acquisition unit 43 that acquires adjacent vehicle information of an adjacent vehicle traveling in an adjacent lane R2 adjacent to the driving lane R1 based on peripheral information; Based on the vehicle information and the adjacent vehicle information, an effect calculation unit 44 for calculating the slipstream effect information for the preceding vehicle and the adjacent vehicle; A display control unit 45 that performs control to display an animation 50 that moves toward the rear of the vehicle from the preceding vehicle display unit 110A and the adjacent vehicle display unit 210A (see FIG. 2).

Based on the effect information, the display control unit 45 performs control to display the effect of the slipstream on the preceding vehicle and the adjacent vehicle by an animation 50 moving toward the rear of the vehicle from the preceding vehicle display unit 110A and the adjacent vehicle display unit 210A. When equipped, the effects of the slipstream on preceding and adjacent vehicles are displayed in animation. Therefore, it is possible to recognize which vehicle, the preceding vehicle or the adjacent vehicle, has a greater slipstream effect. As a result, the driver can drive with awareness of eco-driving.

In the display control device 30 according to the present embodiment, the display control unit 45 displays the moving speed of the animation 50 faster as the effect of the slipstream is greater (see FIGS. 3 and 4).

The display control unit displays the movement speed of the animation 50 faster as the effect of the slipstream is greater, so that the animation 50 is displayed at a high moving speed when the effect of the slipstream is great and the animation 50 is displayed at a low moving speed when the effect of the slipstream is small. Therefore, it is possible to make it easier to recognize which vehicle, the preceding vehicle or the adjacent vehicle, has a greater slipstream effect.

In the display control device 30 according to the present embodiment, the display control unit 45 displays the animation 50 larger as the effect of the slipstream is greater (see FIGS. 3 and 4).

The display control unit 45 displays the animation 50 in a larger size as the effect of the slipstream is greater. As a result, the animation 50 is displayed large when the effect of the slipstream is large. Also, when the effect of the slipstream is small, the animation 50 is displayed small. Therefore, it is possible to make it easier to recognize which vehicle, the preceding vehicle or the adjacent vehicle, has a greater slipstream effect.

The display system 1 according to the present embodiment includes a display control device 30 and a first display unit 21 that is provided in front of the driver's seat in the vehicle cabin and displays an image controlled by the display control device 30 (FIG. 1).

The effect of the slipstream on the preceding vehicle is displayed in front of the driver's seat by the first display unit 21 that is provided in front of the driver's seat in the vehicle cabin and displays an image controlled by the display control device. Therefore, the driver can easily recognize that the slipstream effect is occurring.

In the display control method according to the present embodiment, peripheral information around the own vehicle 10 is acquired, and based on the peripheral information, preceding vehicle information of a preceding vehicle traveling in front of the driving lane R1 of the own vehicle 10 is acquired, Adjacent vehicle information of an adjacent vehicle traveling in an adjacent lane R2 adjacent to the driving lane R1 is acquired based on the peripheral information, and slipstream effect information for the preceding vehicle and the adjacent vehicle is obtained based on the preceding vehicle information and the adjacent vehicle information. is calculated, and based on the effect information, control is performed to display the effect of the slipstream on the preceding vehicle and the adjacent vehicle by an animation 50 that moves toward the rear of the vehicle from the preceding vehicle display unit 110A and the adjacent vehicle display unit 210A.

In the program according to the present embodiment, peripheral information around the own vehicle 10 is acquired, and based on the peripheral information, preceding vehicle information of a preceding vehicle traveling in front of the driving lane R1 of the own vehicle 10 is acquired, and the surrounding information is acquired. Adjacent vehicle information of the adjacent vehicle traveling in the adjacent lane R2 adjacent to the driving lane R1 is acquired based on, and slipstream effect information for the preceding vehicle and the adjacent vehicle is calculated based on the preceding vehicle information and the adjacent vehicle information. Then, based on the effect information, the computer performs control to display the effect of the slipstream on the preceding vehicle and the adjacent vehicle by an animation 50 moving toward the rear of the vehicle from the preceding vehicle display unit 110A and the adjacent vehicle display unit 210A.

The display control device 30 according to the embodiment has been described above based on the above embodiment. However, the specific configuration is not limited to this embodiment, and design changes and the like are permitted as long as they do not depart from the gist of the disclosure according to the claims.

In the above embodiment, the larger the effect of the slipstream, the faster the moving speed of the mark 52 and the larger the animation 50 is displayed. However, the greater the effect of the slipstream, the faster the mark may be moved, or the larger the animation may be displayed. Further, the length of the mark may be increased or the thickness of the mark may be increased as the effect of the slip stream increases.

In the above-described embodiment, the mark 52 has a linear shape extending in the longitudinal direction of the vehicle. However, the mark may have any shape as long as it expresses the wind, and may have, for example, a shape extending in the vehicle width direction.

In the above embodiment, an example of displaying the effect of the slipstream on the preceding vehicle by the animation 50 was shown. However, the effect of the slipstream on the preceding vehicle may be displayed as a still image rather than an animation.

In the above embodiment, an example in which the image showing the effect of the slipstream on the preceding vehicle is output to the head-up display device 25 and projected onto the first display unit 21 has been described. However, the image showing the effect of the slipstream on the preceding vehicle may be output to the second display unit 22 or the third display unit 23.

In the above embodiment, various processors other than the CPU 31 may execute the processing that the CPU 31 reads and executes the program. In this case, the processor is a Programmable Logic Device (PLD) whose circuit configuration can be changed after manufacturing, such as a Field-Programmable Gate Array (FPGA), and an Application Spec Integrated Circuit (ASIC) to execute specific processing. A dedicated electric circuit or the like, which is a processor having a specially designed circuit configuration, is exemplified. Also, the above processing may be executed by one of these various processors, or may be executed by a combination of two or more processors of the same or different type, for example, multiple FPGAs, a combination of a CPU and an FPGA, or the like. Further, a hardware configuration of the various processors is, more specifically, an electric circuit in which circuit elements such as semiconductor elements are combined.

In the above embodiment, various data are stored in the storage unit 34, but the present disclosure is not limited to this. For example, non-temporary recording media such as Compact Disks (CDs), Digital Versatile Disks (DVDs), and Universal Serial Bus (USB) memories may be used as storage units. In this case, various programs and data are stored in these recording media.

What is claimed is:

1. A display control device comprising:
    a processor; and
    a memory storing instructions that cause the processor to
        acquire peripheral information around a host vehicle from a camera mounted on the host vehicle,
        acquire a size of a preceding vehicle traveling ahead of the host vehicle in a traveling lane of the host vehicle based on the peripheral information,
        acquire a size of an adjacent vehicle traveling ahead of the host vehicle in an adjacent lane located on a right side or a left side of the traveling lane based on the peripheral information,
        calculate an effect of a slipstream for the preceding vehicle and the adjacent vehicle based on the size of the preceding vehicle and the size of the adjacent vehicle, and
        cause a head-up display device mounted on the host vehicle to project an image onto a windshield of the host vehicle, the projected image including images of the preceding vehicle, the adjacent vehicle, and the host vehicle, and further including an animation representing the effect of the slipstream based on the calculated effect of the slipstream, wherein
        the animation includes
            first marks displayed on the windshield and each having a linear shape extending on the windshield in a direction from the image of the preceding vehicle toward a lower side of the windshield, and
            second marks displayed on the windshield and each having a linear shape extending on the windshield in a direction from the image of the adjacent vehicle toward the lower side of the windshield,
        the displayed first marks move on the windshield from a position of the preceding vehicle toward the lower side of the windshield,
        the displayed second marks move on the windshield from a position of the adjacent vehicle toward the lower side of the windshield, and
        a moving speed of the displayed first marks and a moving speed of the displayed second marks increase as the effect of the slipstream increases.

2. The display control device according to claim 1, wherein more of the first marks and the second marks are displayed in the animation as the effect of the slipstream increases.

3. The display control device according to claim 1, wherein the instructions further cause the processor to
    acquire a speed of the preceding vehicle and a speed of the adjacent vehicle based on a speed of the host vehicle, a distance from the host vehicle to the preceding vehicle, and a distance from the host vehicle to the adjacent vehicle that are detected by sensors mounted on the host vehicle, and
    calculate the effect of the slipstream for the preceding vehicle and the adjacent vehicle based on the size and the speed of the preceding vehicle and the size and the speed of the adjacent vehicle.

4. The display control device according to claim 1, wherein the instructions further cause the processor to control an operation of the head-up display device to project the first marks on both sides of the image of the preceding vehicle and the second marks on both sides of the image of the adjacent vehicle.

5. The display control device according to claim 1, wherein
    the instructions further cause the processor to control an operation of the head-up display device to project an image of the traveling lane and an image of the adjacent lane,
    the first marks are displayed on the windshield to extend along the image of the traveling lane, and
    the second marks are displayed on the windshield to extend along the image of the adjacent lane.

6. A display system comprising:
    the display control device according to claim 1; and
    the head-up display device.

7. A display control method comprising:
    acquiring peripheral information around a host vehicle from a camera mounted on the host vehicle;
    acquiring a size of a preceding vehicle traveling ahead of the host vehicle in a traveling lane of the host vehicle based on the peripheral information;
    acquiring a size of an adjacent vehicle traveling ahead of the host vehicle in an adjacent lane located on a right side or a left side of the traveling lane based on the peripheral information;
    calculating an effect of a slipstream for the preceding vehicle and the adjacent vehicle based on the size of the preceding vehicle and the size of the adjacent vehicle; and
    causing a head-up display device mounted on the host vehicle to project an image onto a windshield of the host vehicle, the projected image including images of the preceding vehicle, the adjacent vehicle, and the host vehicle, and further including an animation representing the effect of the slipstream based on the calculated effect of the slipstream, wherein
    the animation includes
        first marks displayed on the windshield and each having a linear shape extending on the windshield in a direction from the image of the preceding vehicle toward a lower side of the windshield, and
        second marks displayed on the windshield and each having a linear shape extending on the windshield in a direction from the image of the adjacent vehicle toward the lower side of the windshield,
    the displayed first marks move on the windshield from a position of the preceding vehicle toward the lower side of the windshield,
    the displayed second marks move on the windshield from a position of the adjacent vehicle toward the lower side of the windshield, and
    a moving speed of the displayed first marks and a moving speed of the displayed second marks increase as the effect of the slipstream increases.

8. The display control method according to claim 7, further comprising:
    acquiring a speed of the preceding vehicle and a speed of the adjacent vehicle based on a speed of the host vehicle, a distance from the host vehicle to the preceding vehicle, and a distance from the host vehicle to the adjacent vehicle that are detected by sensors mounted on the host vehicle; and calculating the effect of the slipstream for the preceding vehicle and the adjacent vehicle based on the size and the speed of the preceding vehicle and the size and the speed of the adjacent vehicle.

9. The display control method according to claim 7, further comprising
controlling an operation of the head-up display device to project the first marks on both sides of the image of the preceding vehicle and the second marks on both sides of the image of the adjacent vehicle.

10. The display control method according to claim 7, further comprising
controlling an operation of the head-up display device to project an image of the traveling lane and an image of the adjacent lane, wherein
the first marks are displayed on the windshield to extend along the image of the traveling lane, and
the second marks are displayed on the windshield to extend along the image of the adjacent lane.

* * * * *